United States Patent [19]

Ishida et al.

[11] 4,371,143

[45] Feb. 1, 1983

[54] EARTHQUAKE ISOLATION FLOOR

[75] Inventors: Jiro Ishida, Kamagaya, Japan; Takafumi Fujita, 1-8-2-207, Saiwai-cho, City of Chiba, Chiba Prefecture, Japan

[73] Assignees: Mitsubishi Steel Mfg. Co., Ltd., Tokyo; Takafumi Fujita, Chiba, both of Japan

[21] Appl. No.: 199,981

[22] Filed: Oct. 23, 1980

[30] Foreign Application Priority Data

May 24, 1980 [JP] Japan ................................ 55-69196
Jun. 5, 1980 [JP] Japan ................................ 55-74984

[51] Int. Cl.³ ............................................. F16M 1/00
[52] U.S. Cl. ...................................... 248/638; 52/167; 248/562; 248/636
[58] Field of Search .............. 248/638, 636, 603, 562, 248/548; 52/167

[56] References Cited

U.S. PATENT DOCUMENTS

| 1,281,921 | 10/1918 | Etherington | 248/620 X |
|---|---|---|---|
| 2,055,000 | 9/1936 | Bacigaupo | 52/167 |
| 2,483,295 | 9/1949 | Mortimer | 248/638 |
| 2,912,212 | 11/1959 | Lowe et al. | 248/638 X |
| 3,762,114 | 10/1973 | Eskijian | 52/167 |
| 3,908,940 | 9/1975 | Stricht | 248/638 X |
| 4,187,573 | 2/1980 | Fyfe | 52/167 X |
| 3,2667,759 | 8/1966 | Allen | 248/615 |

Primary Examiner—J. Franklin Foss
Attorney, Agent, or Firm—Amster, Rothstein & Engelberg

[57] ABSTRACT

An earthquake isolation floor comprises a horizontal plate-like support frame having a generally polygonal configuration, a support frame having a horizontal surface with a similar configuration to that of the fundamental frame in plan view, but of relatively smaller dimensions and slidably mounted thereon, and horizontal tensile springs disposed between the fundamental and support frames each in a prestressed condition such that when the support frame is moved relative to the fundamental frame by an earthquake, etc. the springs are caused to be elongated by the fact that their one end in the direction of the movement does not encounter any resistance to the movement, while the other end opposite to the movement is prevented from moving.

26 Claims, 14 Drawing Figures

EARTHQUAKE ISOLATION FLOOR

BACKGROUND OF THE INVENTION

The present invention relates to an earthquake isolation floor and more particularly to an earthquake isolation floor particularly adapted for keeping machinery and tools, etc. to be mounted thereon free from vibration such as caused when they are subjected to an earthquake, or the like.

For instance, electronic computers, emergency dynamos, dangerous objects (e.g. dynamite, chemicals, etc.), etc. should continue to operate or be stored in safety even during an earthquake. From this point of view there is considerable attention being paid to anti-earthquake or anti-vibration means for support frames to mount machinery and tools, etc. and for places for storing dangerous objects.

Countermeasures against vibration can be divided into two kinds at present:

(1) Such equipment as atomic energy plants, spherical tanks, electrical substations, etc. are originally designed against earthquakes by examining them structurally so that they will have sufficient strength against seismic input, and increasing their strength.

(2) Machinery and tools, dangerous objects, etc. are secured on a floor which is mounted on springs such that the springs absorb the seismic input when such occurs so that the machinery and tools, etc. can be kept free from danger, such a floor being referred to as a so-called "earthquake isolation floor".

The present invention relates in particular to the latter, i.e. the "earthquake isolation floor".

Hitherto earthquake isolation floors have comprised a sliding plate, a support frame slidably mounted on the plate with low friction elements being interposed therebetween, a number of springs disposed horizontally between the support frame and a foundation on which the sliding plate is laid, a floor mounted on the support frame through springs disposed vertically, a number of dampers disposed vertically between the support frame and the floor, and a latch means to secure the vertical springs during normal periods. In this earthquake isolation floor the vertically arranged springs are constituted such that they are brought into operation only after the latch means is released due to the onset of a seismic input greater than a predetermined value.

However, this hitherto known earthquake isolation floor has the following problems:

(1) It is difficult to establish the minimum acceleration at which the latch means is released;
(2) It is difficult to reset the latch means after the floor has been once released;
(3) Since no lock means in the horizontal direction is provided, it is difficult to establish a minimum acceleration at which the vibration free effects are revealed;
(4) It is difficult to restore the floor after it has once moved in the horizontal direction;
(5) There is a danger of rocking on the vertical springs; and
(6) Since the transverse rigidity of the vertical springs cannot be ignored with regard to the horizontal springs, the establishment of the horizontal springs and an estimate of their effectiveness, are made difficult.

The present inventors have already proposed a new invention entitled "Earthquake Isolation Floor" for the purpose of conquerring such difficulties in the conventional earthquake isolation floors as discussed above. In this connection reference should be made to Japanese Patent Application No. 145419/1979, assigned to Mitsubishi Steel Co., Ltd., corresponding to U.S. Ser. No. 199,980 filed on Oct. 23, 1980. That is, this proposed invention is characterized in that in order to attain its objects a support frame on which machinery and tools, etc. to be prevented from vibration are secured is mounted on a fundamental frame by means of sliding faces, secured to the bottom of the support frame and comprising a material having a low coefficient of friction, and disposed between the confronting ends or peripheries of the support frame and the fundamental frame are horizontal coil springs, each in a precompressed state, and dampers, a cover member being fixedly secured to the fundamental frame so as to surround the support frame with a gap being left therebetween, whereby the horizontal springs as well as the dampers are received within the space formed around the support frame by the cover member, the cover member being adapted to act as a rocking prevention means in association with the support frame and at the same time as a dust protection cover for the sliding surfaces of the support frame.

Although it has been confirmed that this proposed earthquake isolation floor can attain its proposed objects, in order to increase its vibration free effects it is necessary to make the spring constant small, but, in the case of a compression spring as in this invention, since it is prone to easy buckling when the spring constant is small and the spring buckles easily when it is displaced in a direction oblique to its axis, there arises the problem that its vibration free effects cannot be made great.

SUMMARY OF THE INVENTION

It is a primary object of the present invention to provide a new and improved earthquake isolation floor which can do away with all of the defects of the hitherto known floors as abovementioned and yet eliminate the problem of the previously proposed earthquake isolation floor.

It is another object of the present invention to provide an earthquake isolation floor in which the vibration free effects can be revealed in any horizontal direction.

It is still another object of the present invention to provide an earthquake isolation floor which has restoring force against rotation and can reveal vibration free effects against rotation.

It is yet another object of the present invention to provide an earthquake isolation floor in which a preload can be freely given, i.e. the minimum acceleration at which the vibration free effects begin to be revealed can be easily pre-set as desired and until such a minimum acceleration is reached it is restrained from exhibiting vibration free effects.

It is a further object of the present invention to provide an earthquake isolation floor which can automatically restore to its normal condition after once being subjected to a seismic input causing it to reveal the vibration free effects.

It is a still further object of the present invention to provide an earthquake isolation floor which is simple in constitution.

It is a yet further object of the present invention to provide an earthquake isolation floor which allows use as a unit so that a number of the units can be adapted to carry a common support frame thereon to mount objects to be protected against vibration on the common support.

In accordance with the present invention an earthquake isolation floor is provided which comprises a stationary horizontal fundamental frame having a substantially polygonal configuration in plan view, a movable horizontal support frame having a similar configuration to that of the fundamental frame, but smaller in dimensions than that of the fundamental frame and slidably mounted thereon, and horizontal tensile springs disposed between the fundamental and support frames each in a prestressed condition such that when the support frame is moved relative to the fundamental frame due to the effects of an earthquake, etc. the springs are caused to be elongated, whereby the support frame is given restoring force by the springs.

In a preferred embodiment of the present invention the support frame has a rectangular configuration in plan view, a pair of spring mounting brackets being respectively arranged along one pair of the confronting sides of the support frame on said fundamental frame so as to cause both ends of said brackets to somewhat project beyond the sides, whereby the confronting ends of the respective spring mounting brackets are connected together by the horizontal tensile springs respectively disposed along the other pair of confronting sides of the support frame, and stopping means are provided on the fundamental frame beneath the support frame at its normal position and in alignment with the spring mounting brackets, respectively.

In a further advantageous embodiment of the present invention the support frame has a rectangular, preferably square, configuration in plan view, and spring mounting brackets each having an L-shaped configuration are respectively disposed at each of the outer corners of the support frame, whereby the confronting ends of the respective spring mounting brackets are respectively connected by the horizontal tensile springs along the respective sides of the support frame, and stopping means are provided on the fundamental frame beneath the respective corners of the support frame at its normal position and in alignment with the spring mounting brackets, respectively.

In a modification of the above advantageous embodiment a number of the horizontal tensile springs excluding at least one may be replaced by wire means to have the ends thereof connected to the remaining horizontal tensile spring(s), whereby there are provided pulley means on the outer corners of the respective spring mounting brackets to guide the wire means thereby.

Further, as a modification of the present invention, in place of the stopping means as used in the above earthquake isolation floors deformable means which can resist tension, but not compression may be used in such a manner that they are suitably arranged between the fundamental frame and the support frame in tensioned states in the normal position of the support frame with their ends being secured to the fundamental frame and the support frame, respectively.

Additionally, in the present invention it is also contemplated that the support frame may be surrounded by the vertical walls secured to the outer periphery of the fundamental frame and a substantially rib-shaped cover plate connected at its outer periphery to the top end of the vertical wall with its inner periphery overlapping the upper marginal portion of the support frame and leaving a small gap therebetween, whereby the cover plate acts as a rocking prevention means for the support frame during an earthquake, etc.

It will also be appreciated that the earthquake isolation floor according to the present invention can be used as a unit for carrying a common support frame such that a number of the units are arranged at intervals so as to mount a common support frame on their support frames in association with each other, whereby the common support frame is adapted to mount machinery and tools, etc. of relatively large dimensions or weight.

BRIEF DESCRIPTION OF THE DRAWINGS

The above and other objects of the present invention will be more fully understood by reference to the following detailed description of the presently preferred, but nonetheless illustrative embodiments, in accordance with the present invention, when taken in conjunction with the accompanying drawings, wherein.

DESCRIPTION OF THE PREFERRED EMBODIMENTS

Figure 1:
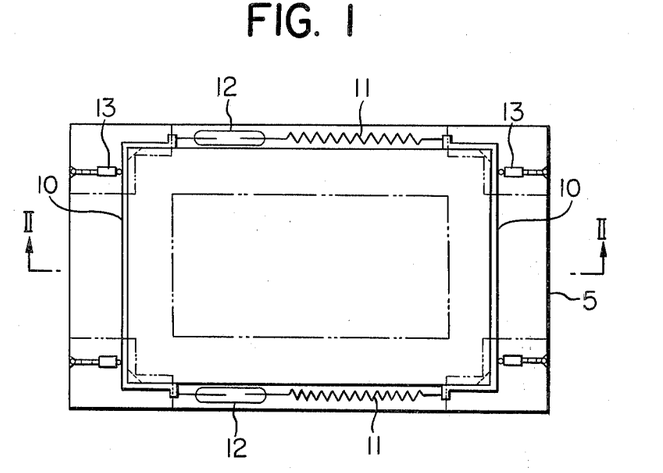
FIG. 1 shows a schematic plan view of one embodiment of the present invention.
Figure 2:
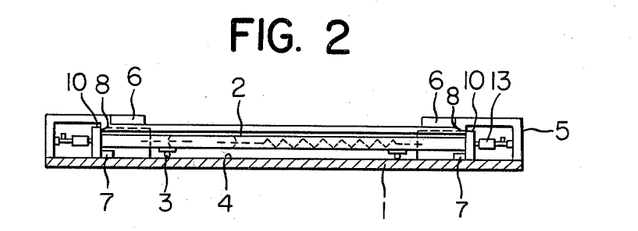
FIG. 2 is a vertical sectional view of the embodiment shown in FIG. 1 taken along the line II—II of FIG. 1.

Referring now to FIGS. 1 and 2 of the attached drawings, therein is shown an embodiment which comprises a plate-like horizontal fundamental frame having e.g. a rectangular configuration and a horizontal support frame 2 movably mounted on fundamental frame 1 which has a similar configuration to that of fundamental frame 1 in plan view, but is smaller in dimensions than that of fundamental frame 1. Support frame 2, adapted to mount thereon machinery and tools, etc. to be protected against vibration, is mounted on fundamental frame 1 through low friction elements 3 secured to the bottom of support frame 2 so as to effect a smooth relative movement. The embodiment shown is constituted to exhibit the vibration prevention effect only in the direction of the longer sides of the rectangular configuration of support frame 2. In this case, as low friction elements 3 bars made of an appropriate synthetic resin are preferably used to be associated with a low friction surface 4 of fundamental frame 1 constituted by forming thereon a layer of an appropriate synthetic resin so that support frame 2 can be smoothly moved in the longitudinal direction. Alternatively, balls or rollers may be used in place of bars 3 of support frame 2 to be freely rotated in position so that they are guided by races arranged on fundamental frame 1 in its longitudinal direction. Fundamental frame 1 is provided with a vertical wall 5 along its whole outer periphery with an appropriate gap being left between the outer periphery of support frame 2 and the inner surface of wall 5, the height of vertical wall 5 being somewhat higher than the upper surface of support frame 2. Horizontal rib 6 is secured at its outer periphery to vertical wall 5 at its upper edge so that its inner periphery overlaps substantially the marginal portion of the upper surface of support frame 2, whereby a small gap is left between the upper surface of support frame 2 and the under surface of rib 6. Thus, support frame 2 is surrounded by fundamental frame 1, vertical wall 5 and rib 6 so that there is formed a kind of a dust prevention chamber around support frame 2.

A pair of spring mounting brackets 10 are respectively arranged around the respective confronting transverse sides of support frame 2 together with its neighbouring longitudinal sides partly so that brackets 10 loosely enclose the transverse sides, confronting ones of the two ends of respective brackets 10 being respectively connected together by horizontal tension coil springs 11 each in a prestressed condition, whereby coil springs 11 are respectively provided with length adjusting means such as turnbuckles 12 so that their tension can be adjusted. Further, stopping means 7 and 8 are respectively provided on the upper surface of fundamental frame 1 and the lower surface of rib 6 at the positions of the transverse sides of support frame 2 corresponding to its normal position. Thus, it will be appreciated that, when support frame 2 is moved in one direction along the longer sides towards vertical wall 5, spring mounting bracket 10 in that direction can move together with support frame 2, but spring mounting bracket 10 in the opposite direction is prevented from movement by stopping means 7, 8, whereby coil springs 11 are tensioned. It is possible, if required, to mount a number of horizontal dampers 13 between respective spring mounting brackets 10 and respective confronting vertical walls 5.

Thus, in the embodiment shown, when support frame 2 is moved relative to fundamental frame 1 in the direction of the longitudinal sides by an earthquake, etc., spring mounting bracket 10 in the direction of motion moves together with support frame 2, but spring mounting bracket 10 in the opposite direction is prevented from movement by stopping means 7, 8, and springs 11 which are connected at their ends to spring mounting brackets 10 are elongated. Therefore, support frame 2 has a restoring force applied thereto by the elongated springs 11. In this case, the spring constant of horizontal springs 11 should be previously selected so that its natural frequency is smaller than the frequency of the external force. The minimum acceleration at which support frame 2 begins to move in response to the seismic input can be pre-adjusted by applying a suitable tensile pre-load to horizontal springs 11 by the adjustment of length adjusting means 12. In this case, the smaller the clearances between spring mounting brackets 10 and support frame 2, the more accurately support frame 2 will move at an acceleration previously set.

Figure 3:
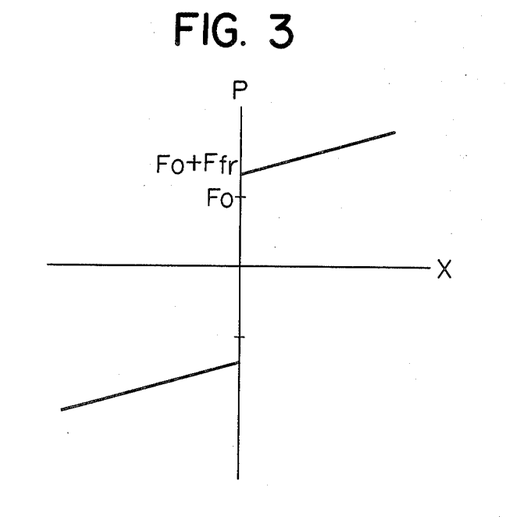
FIG. 3 is a diagram showing the relationship between the deflection and the load of the horizontal spring shown in FIG. 1 or 2.

To explain this by reference to FIG. 3, wherein the abscissa and the ordinate represent the displacement X and the load Y, respectively, assuming that the pre-load caused by previously elongated spring 11 is Fo(kg), the coefficient of static friction Frr(N), and the total mass above low friction elements 3 is m(N), it shows that unless the input acceleration satisfies the expression $Acx > (Fo + Fff)/m$, support frame 2 will not move.

Actually, if the spring constant of each of springs 11 in FIGS. 1 and 2 is taken as $K/2(N/m)$, the whole mass above low friction elements 3 is taken as m(kg) and the static friction force is actually measured as Ffr(N), then the previous tensile length $\delta$(m) of spring 11 to make support frame 2 stand still relative to fundamental frame 1 till the input acceleration of spring 11 in its length direction reaches 100(Gal), is formulated by the following:

$$m = K\delta + Ffr.$$

Therefore, this equation becomes as follows:

$$\delta = (m - Ffr)/K.$$

That is, this means that it is proper to preelongate each of springs 11 by $\delta$(mm). In this case, if dampers 13 are disposed between fundamental and support frames 1, 2, a damping force is given when the damping force of horizontal springs 11 is smaller than that required.

Figure 4:
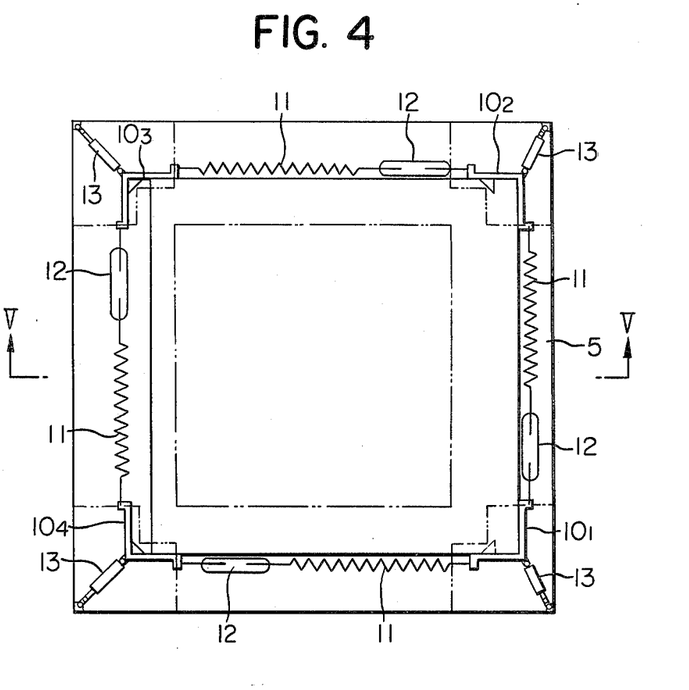
FIG. 4 is a similar view to FIG. 1 showing another embodiment of the present invention.
Figure 5:
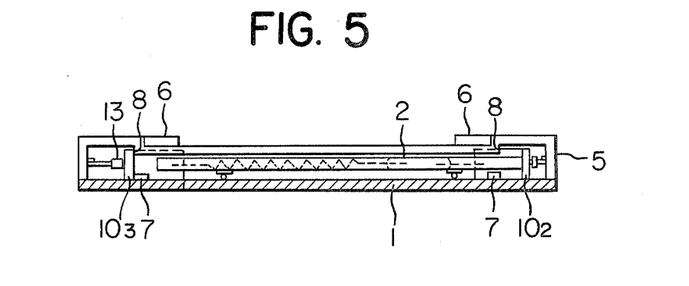
FIG. 5 is a vertical sectional view of the embodiment shown in FIG. 4 taken along the line V—V of FIG. 4.

Thus, although the embodiment shown in FIGS. 1 and 2 exhibits the vibration prevention effect only in the longitudinal direction of support frame 2, FIGS. 4 and 5 show another embodiment of the present invention which is effective against all rotational and translational movements in the given plane. In these figures, fundamental and support frame 1 and 2 are shown as respectively having a square configuration in plan view. Further, spring mounting brackets $10_1$ to $10_4$ are arranged respectively at each outer corner of the square, each of brackets $10_1$ to $10_4$ having a substantially L-shaped configuration, and the confronting ends of respective spring mounting brackets $10_1$ to $10_4$ are respectively connected by horizontal coil springs 11 and length adjusting means 12 along the sides of the square. Respective spring mounting brackets $10_1$ to $10_4$ are prevented from being moved inwards by stopping means 7 and 8, respectively, provided on fundamental frame 1 and rib 6 at the positions corresponding to the position of support frame 2 in its normal state in alignment with spring mounting brackets $10_1$ to $10_4$, respectively. Additionally, in FIGS. 4 and 5 dampers 13 are shown as arranged between the respective corners of spring mounting brackets $10_1$ to $10_4$ and the respective confronting corners of vertical wall 5 of fundamental frame 1.

Also in this embodiment, similarly as with that shown in FIGS. 1 and 2, when support frame 2 is caused to move by an earthquake, or the like, horizontal tensile springs 11 lying in the direction of motion are elongated so that a restoring force is applied to the support frame.

In FIGS. 4 and 5, by way of example support frame 2 is shown as being caused to move towards the right as viewed in the drawings, tensile springs 11 in that direction being shown in the elongated state. Not only are springs 11 in that direction caused to move by the earthquake, but also the relevant tensile springs 11 are elongated by the earthquake in other horizontal directions. Therefore, it will be apparent that the embodiment shown in FIGS. 4 and 5 can effectively be given a restoring force against both translational and rotational movement of support frame 2. In this case, if dampers 13 are actually associated with tensile springs 11, the damping force is increased.

Figure 6:
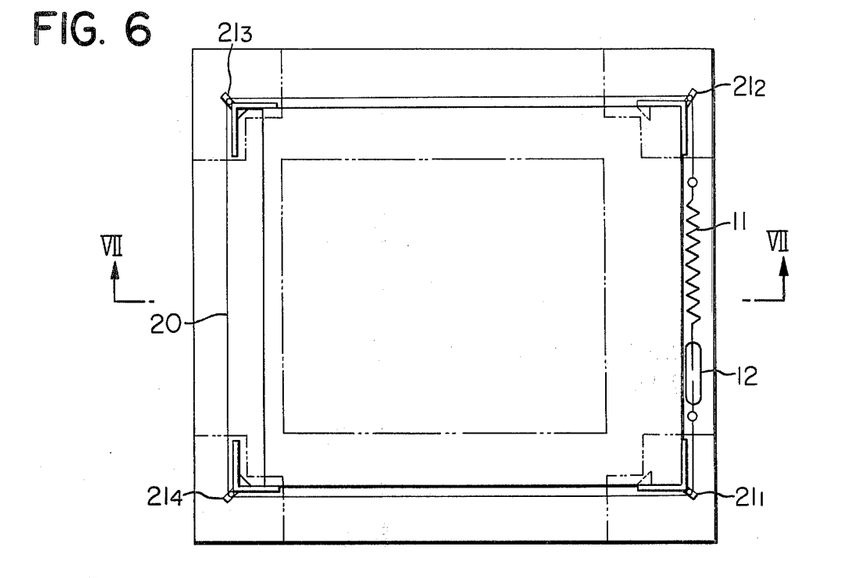
FIG. 6 is a plan view of a modification of the embodiment shown in FIGS. 4 and 5.
Figure 7:
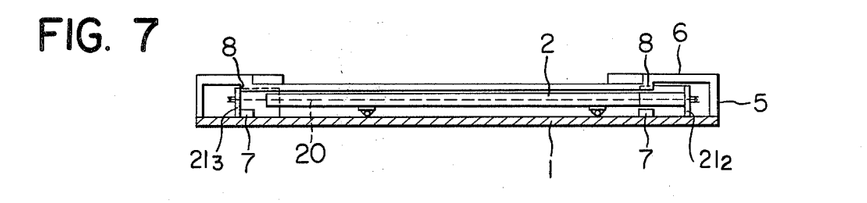
FIG. 7 is a vertical sectional view of the embodiment shown in FIG. 6 taken along the line VII—VII of FIG. 6.

FIGS. 6 and 7 show a modification of the embodiment shown in FIGS. 4 and 5. In this embodiment, three of the horizontal tensile springs 11 and length adjusting members 12 are replaced by a wire means 20 such as a wire-rope, cable, chain, etc. and pulley means $21_1$ to $21_4$ are provided at the outer corners of spring mounting brackets $10_1$ to $10_4$, respectively, so that wire means 20 is reeved on pulley means $21_1$ to $21_4$ to be connected at its ends to the remaining set of spring 11 and length adjusting means 12. Thus, a loop is constituted by the set of spring 11 and length adjusting means 12 as well as wire means 20. It will be apparent that this embodiment can operate quite similarly to that shown in FIGS. 4 and 5. It will also be apparent that a similar operation will be equally obtainable even if only one or two tensile springs 11, instead of three, are replaced by wire means 20 so as to form a similar loop.

Figure 8:
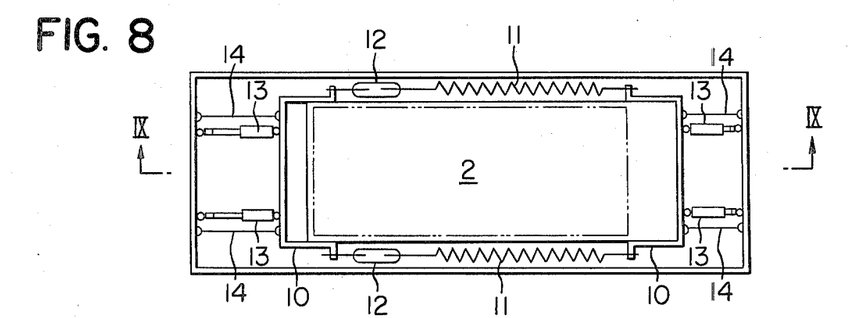
FIG. 8 is a schematical plan view of another embodiment of the present invention.
Figure 9:
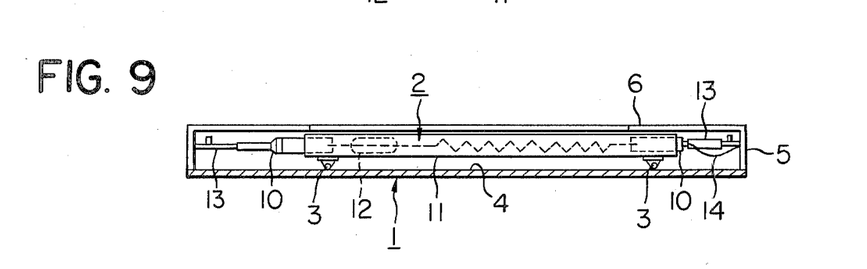
FIG. 9 is a vertical plan view of the embodiment shown in FIG. 8 taken along the line IX—IX of FIG. 8.

FIGS. 8 and 9 show a further embodiment of the present invention. This embodiment differs from that shown in FIGS. 1 and 2 in that, in the latter, the movement of spring mounting brackets 10 towards each other by the action of horizontal tensile springs 11 is prevented by stop means 7 and 8 provided on fundamental frame 1 and rib 6, respectively, while, in the former, spring mounting brackets 10 and confronting vertical wall 5 are connected together by a set of flexible retaining means 14 at the normal position of support frame 2 such that each of retaining means 14 is kept in an unslackened, stretched state, whereby retaining means 14 has such characteristics that it resists tension, but does not resist compression. As retaining means 14 wires, ropes, chains and the like are conceivable. Thus, it will be appreciated that, when support frame 2 moves in the direction along its long sides relative to fundamental frame 1 due to such as an earthquake, spring mounting bracket 10 in the moving direction of support frame 2 can be moved together with support frame 2 since spring mounting bracket 10 in that direction can not meet any resistance from retaining means 14 located in that direction, whereas spring mounting bracket 10 in the opposite direction cannot move since it is resisted by retaining means 14 located in that direction, resulting in the elongation of horizontal tensile springs 11, restoring force being applied to support frame 2. If required, as shown in FIGS. 8 and 9, a number of horizontal dampers 13 may be arranged as in the embodiment shown in FIGS. 1 and 2 for the purpose of assisting in the damping.

Figure 10:
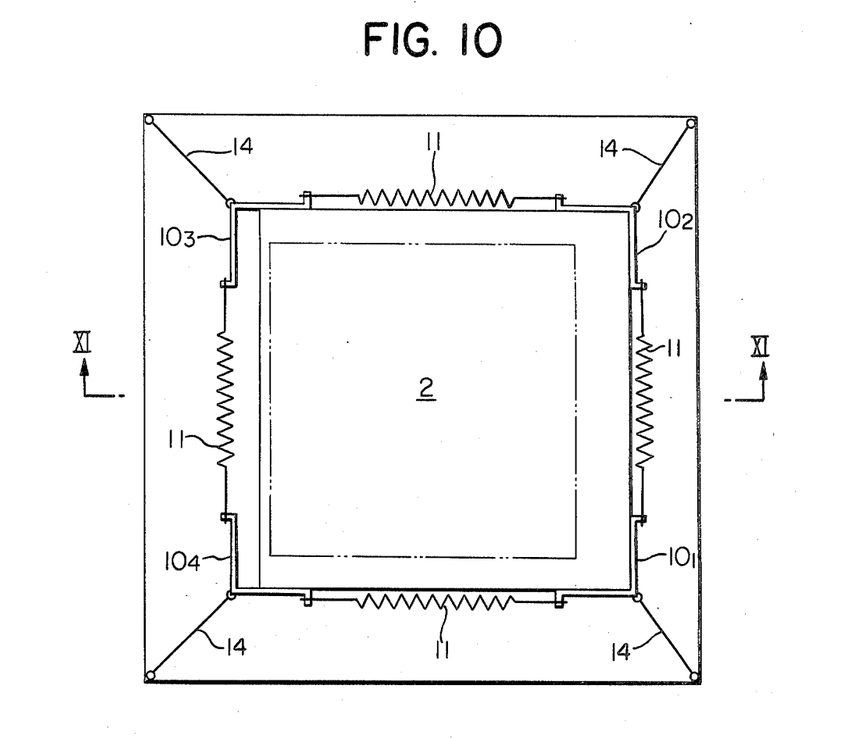
FIG. 10 is a schematical plan view of still another embodiment of the present invention.
Figure 11:
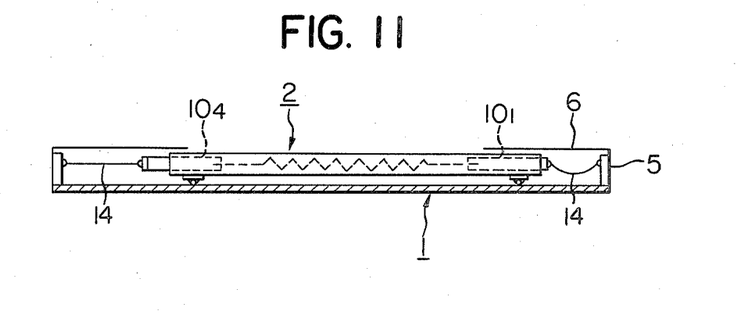
FIG. 11 is a vertical sectional view of the embodiment shown in FIG. 10 taken along the line XI—XI of FIG. 10.
Figure 12:
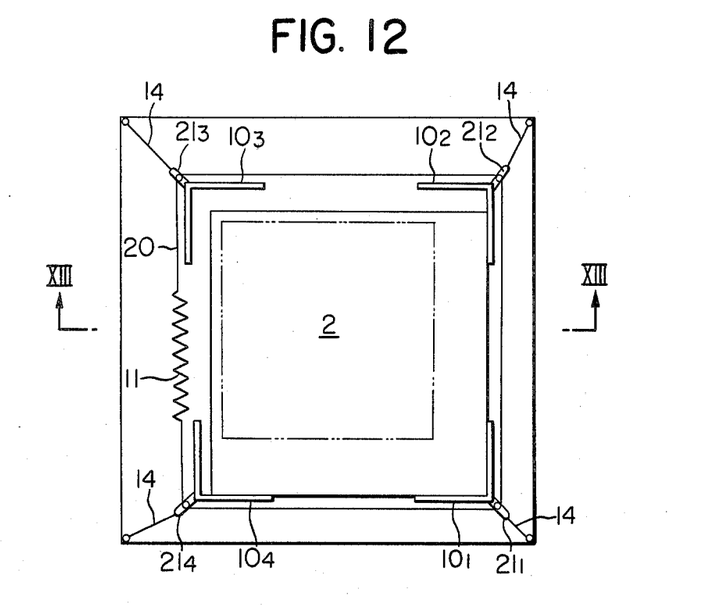
FIG. 12 is a similar view to FIG. 10 of a modification of the embodiment shown in FIGS. 10 and 11.
Figure 13:
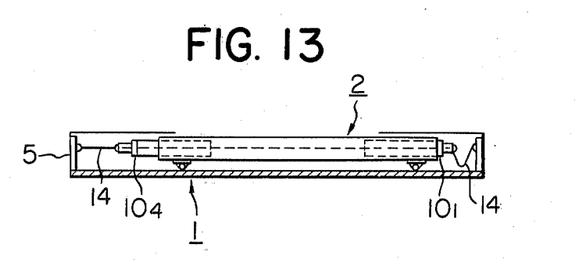
FIG. 13 is a vertical sectional view of the embodiment shown in FIG. 12 taken along the line XIII—XIII of FIG. 12.

FIGS. 10 and 11 show an embodiment of the present invention which is comparable with that shown in FIGS. 4 and 5. The former differs from the latter in that, in the former, dampers 13 shown in FIGS. 4 and 5 are respectively replaced by retaining means 14 and stopping means 7 and 8 as required in the latter are all eliminated. It will be apparent that the embodiment shown in FIGS. 10 and 11 behaves quite analogously to that shown in FIGS. 4 and 5 upon being subjected to an earthquake, etc. for the reasons that retaining means 14 operate in a manner quite similar to that in the embodiment shown in FIGS. 8 and 9, in other words, they operate exactly similarly to stopping means 7, 8 in FIGS. 4 and 5. Thus, in FIGS. 10 and 11, by way of example, support frame 2 is shown as moved to the right as viewed in the drawings. Reference should be made to FIGS. 4 and 5. In the case of the embodiment shown in FIGS. 10 and 11, too, as in the case of the embodiment shown in FIGS. 6 and 7, one or more of tensile springs 11, but leaving one, may be replaced by a wire means with pulley means being provided at the respective outer corners of spring mounting bracket $10_1$ to $10_4$ so as to be reeved by the wire means. FIGS. 12 and 13 show an embodiment in which, in the embodiment shown in FIGS. 10 and 11, three of the horizontal tensile springs 11 are replaced with a single wire means 20 with pulley means $21_1$ to $21_4$ being provided at the outer corners of spring mounting brackets $10_1$ to $10_4$, respectively, whereby wire means 20 is reeved on pulley means $21_1$ to $21_4$ so that one tensile spring 11 and wire means 20 form a loop. This embodiment corresponds to the embodiment shown in FIGS. 6 and 7 only differing in that the former replaces stopping means 7, 8 in the latter with deformable retaining means 14. It will be apparent that the former acts exactly similarly to the latter when an earthquake, etc. occurs.

Figure 14:
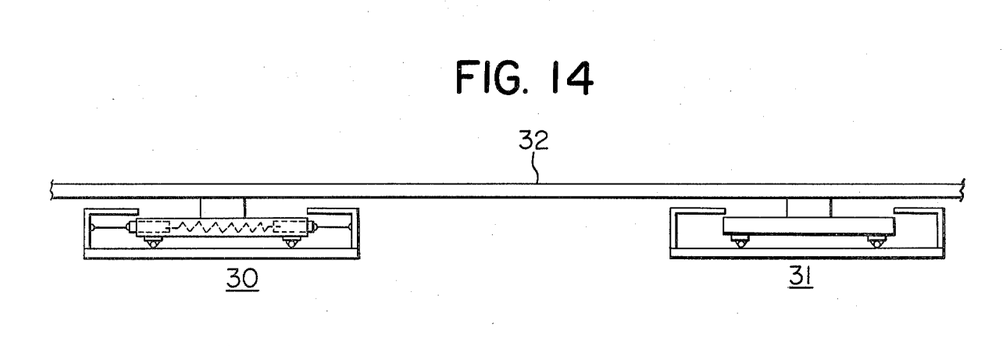
FIG. 14 is a partial sectional view of a portion of an earthquake isolation floor according to the present invention which is constituted by a number of earthquake isolation floors which may be any of the embodiments shown in the previous drawings.

Finally, FIG. 14 shows an embodiment of the present invention in which an earthquake isolation floor having a relatively large area is realized by the use of a plurality of earthquake isolation floors 30 each acting as a carrying unit, a number of low friction units 31 and a common support frame 32 carried on the support frames of units 30 and low friction units 31. As carrying unit 30 any of the embodiments described above and shown in the drawings may be used. As for low friction unit 31, it may comprise a fundamental frame and a support frame slidably mounted thereon through rollers as suggested in FIG. 14, the fundamental and support frames being constituted quite similarly to those of the earthquake isolation floors explained above and shown in the drawings.

It is to be understood that although certain forms of this invention have been illustrated and described, it is not to be limited thereto except so far as such limitations are included in the following claims:

What is claimed is:

1. An earthquake isolation floor comprising a stationary horizontal fundamental frame having a substantially polygon configuration in plane view, a movable horizontal support frame having a similar configuration to that of said fundamental frame, but smaller in dimensions than that of said fundamental frame, and slidably mounted thereon, said support frame has a substantially rectangular configuration in plane view, horizontal tensile springs disposed between said fundamental and support frames each in a prestressed condition such that when said support frame is moved relative to said fundamental due to the onset of an earthquake, said springs are caused to be elongated by the fact that one end of said springs does not encounter any resistance to the movement thereof, while the other end opposite to the movement is prevented from moving, a pair of spring-mounting brackets being respectively arranged along one pair of the confronting sides of said support frame on said fundamental frame so as to have each end of said bracket somewhat projected beyond said sides, whereby the confronting ends of said spring-mounting bracket are connected together by said horizontal tensile springs respectively disposed along the other pair of the confronting sides of said support frame, and stopping means are provided on said fundamental frame as the normal position of said support frame such that, when said support frame is moved in the direction of said horizontal tensile springs, one of said spring-mounting brackets arranged in said direction can be moved in accompaniment with said support frame, while the other of said spring-mounting brackets arranged opposite to said direction is prevented from moving by said stopping means.

2. An earthquake isolation floor as claimed in claim 1 wherein said stopping means are solid elements which are secured to said fundamental frame beneath said pair of confronting sides of said support frame at its normal position in alignment with said spring mounting brackets, respectively.

3. An earthquake isolation floor as claimed in claim 1 wherein said support frame is slidably mounted on said fundamental frame by means of sliding elements disposed therebetween.

4. An earthquake isolation floor as claimed in claim 3 wherein said sliding elements are low friction elements.

5. An earthquake isolation floor as claimed in claim 3 wherein said sliding elements are balls.

6. An earthquake isolation floor as claimed in claim 3 wherein said sliding elements are rollers.

7. An earthquake isolation floor as claimed in claim 1 wherein said stopping means are deformable elements resistant to tension, but non-resistant to compression, respectively disposed between said spring-mounting bracket and said fundamental frame at the normal position of said support frame in the direction of said horizontal tensile spring, whereby both ends of each of said deformable elements are secured to the outer peripheries of said fundamental and spring-mounting bracket, respectively.

8. An earthquake isolation floor as claimed in claim 7 wherein said deformable elements are wires, chains, ropes, strings, etc.

9. An earthquake isolation floor as claimed in claim 7 wherein said deformable elements are chains.

10. An earthquake isolation floor as claimed in claim 7 wherein said deformable elements are ropes.

11. An earthquake isolation floor as claimed in claim 7 wherein said deformable elements are strings.

12. An earthquake isolation floor as claimed in claim 1 wherein said support frame has a substantially rectangular configuration in plan view, and spring mounting brackets each having a substantially L-shaped configuration are respectively disposed at each of the outer corners of said support frame, whereby the confronting ends of said spring mounting brackets along the respective sides of said support frame are respectively connected by said horizontal tensile springs, and said spring mounting brackets are retained by stopping means such that those arranged in the moving direction of said support frame at the time of movement relative to said fundamental frame caused by an earthquake, etc. can be moved by said support frame, while those arranged in the opposite direction are prevented from moving.

13. An earthquake isolation floor as claimed in claim 12 wherein said stopping means are solid elements which are secured to said fundamental frame, beneath the respective corners of said support frame at its normal position in alignment with said spring mounting brackets.

14. An earthquake isolation floor as claimed in claim 12 wherein said stopping means are deformable elements resistant to tension, but non-resistant to compression, respectively disposed between said fundamental frame and said support frame at the normal position of said support frame such that they elongate substantially in the diagonal directions of said spring-mounting bracket with both ends of each being fixedly secured to the respective outer corners of said support frame and said fundamental frame.

15. An earthquake isolation floor as claimed in claim 12 wherein a number of said horizontal tensile springs excluding one are replaced by wire means and said spring mounting brackets are respectively provided with pulley means at their outer corners to be reeved by said wire means.

16. An earthquake isolation floor as claimed in claim 15 wherein said support frame has its upper marginal portion covered by a horizontal rib means with a small gap being left therebetween, whereby said rib means is secured at its outer periphery to the upper end of a vertical wall which is secured at its lower end to said fundamental frame at its outer periphery so as to surround said support frame.

17. An earthquake isolation floor as claimed in claim 15 wherein said support frame is slidably mounted on said fundamental frame by means of sliding elements disposed therebetween.

18. An earthquake isolation floor as claimed in claim 15 wherein a number of said earthquake isolation floors are disposed at intervals as earthquake isolation floor units so that said support frames of said earthquake isolation floor units are adapted to carry a common support frame thereon for machinery and tools, of relatively large dimensions and weight.

19. An earthquake isolation floor as claimed in claim 17 wherein said sliding elements are low friction elements.

20. An earthquake isolation floor as claimed in claim 17 wherein said sliding elements are balls.

21. An earthquake isolation floor as claimed in claim 17 wherein said sliding elements are rollers.

22. An earthquake isolation floor as claimed in claim 18 wherein one or more low friction units are arranged in association with said earthquake isolation floor units.

23. An earthquake isolation floor as claimed in claim 22 wherein said support frames are respectively slidably mounted on said fundamental frame, respectively, by means of sliding elements disposed therebetween.

24. An earthquake isolation floor as claimed in claim 23 wherein said sliding elements are low friction elements.

25. An earthquake isolation floor as claimed in claim 18 wherein said support frames are respectively slidably mounted on said fundamental frames, respectively, by means of sliding elements disposed therebetween.

26. An earthquake isolation floor as claimed in claim 25 wherein said sliding elements are low friction elements.

* * * * *